United States Patent [19]
Holt

[11] Patent Number: 5,304,804
[45] Date of Patent: Apr. 19, 1994

[54] TURNS COUNT ANOMALY DETECTOR

[75] Inventor: James C. Holt, Fayetteville, Tenn.

[73] Assignee: The United States of America as represented by the Secretary of the Army, Washington, D.C.

[21] Appl. No.: 970,205

[22] Filed: Nov. 2, 1992

[51] Int. Cl.$^5$ ............................................. G01B 11/16
[52] U.S. Cl. ................................. 250/338.1; 356/73.1
[58] Field of Search ..................... 250/338.1, 340, 353; 356/51, 73.1

[56] References Cited

U.S. PATENT DOCUMENTS

| | | | |
|---|---|---|---|
| 3,884,585 | 5/1975 | Lebduska | 356/73.1 |
| 4,090,793 | 5/1978 | Lebduska | 356/73.1 |
| 5,160,972 | 11/1992 | Walters et al. | 356/73.1 |

Primary Examiner—Paul M. Dzierzynski
Assistant Examiner—Richard Hanig
Attorney, Agent, or Firm—Hugh P. Nicholson; Freddie M. Bush

[57] ABSTRACT

A turns count anomaly detector for detecting any irregularities in the payout count of a fiber optic able from fiber optic dispensers. The detector receives an input from an infrared source and receiver that monitors a fiber optic cable during fiber optic cable payout at speeds up to 700 feet per second. A turns count pulse electronics circuitry supplies an input to a turns count anomaly detector. The turns count anomaly detector is comprised of transistor transistor logic one-shot configured as a negative recovery monostable multivibrator. Input to the one-shot is received from a pulse conditioning circuit comprised of a logic signal inverter and a digital flip-flop. The input to the pulse conditioning circuit is the output from the turns count pulse electronics. The output from the one-shot is a logic low which represents an anomaly in payout which is marked on a strip-chart recorder for manual review or recorded for replaying and stripping at 1/400 of real-time speed for calibrated peel off speeds up to about 700 feet per second for use of the turns count anomaly detector in a real-time mode.

4 Claims, 2 Drawing Sheets

TURNS COUNT ANOMALY DETECTOR

DEDICATORY CLAUSE

The invention described herein may be manufactured, used, and licensed by or for the Government for governmental purposes without the payment to me of any royalties thereon.

BACKGROUND OF THE INVENTION

During the flight of a fiber optic guided missile, a thin strand of fiber optic cable is spooled out from the pack of the missile. One end of the fiber is attached to the Airborne Electronics Unit (AEU) in the missile and the other end is attached to the Ground Electronics Unit (GEU) or the aircraft electronic unit from which the missile is launched. To ensure a successful flight without utilizing actual flight hardware, fiber optic payout testing is performed in the laboratory. A successful test is considered to be one in which the fiber does not fail and no turns count anomalies are seen in the played back data. Fiber is wound onto a conical mandrel in a very precise manner, called a Precision Wind. The fiber is held onto the mandrel with adhesive. If the adhesive is behaving as required the fiber will payout from the mandrel in the same precise manner.

At the present time there exists no noncomputer based system that can actively search for turns count anomalies. The present method to detect the presence of such an anomaly is by means of computer software, high-speed video, or the laborious process of slow motion playback of recorded payout data. All of these processes are time consuming and costly. The high speed video method has not proven very reliable because the camera triggering is not consistent enough or fast enough to catch every payout turn.

An object of this invention is to provide a real-time detector for turns count anomaly.

Another object of the invention is to provide a marker at the area of incidence of turns count anomaly which allows correlation of payout failure with the presence of turns count anomalies.

A further object of the invention is to provide a detector for automatic detection of turns count anomalies.

SUMMARY OF THE INVENTION

The turns count anomaly detector (TCAD) of this invention is an electronic device that detects any irregularity in the payout count of a fiber optic cable from fiber optic dispensers.

The detector device and system is comprised of a transistor transistor logic (TTL) one-shot configured as a negative recovery monostable multivibrator. Input to the one-shot is received from a pulse conditioning circuit comprised of a logic signal inverter and a digital flip-flop. The desired time between output pulses is set by selecting exterior discrete components. The incoming pulse train is connected to the reset input of the one-shot. As long as the "low time" of the incoming pulses is less than the set time between pulses of the circuit no indication of an anomaly is received. When the "low time" exceeds the time between pulses, the system provides an immediate visual indication of a turns count anomaly. The immediate visual indication of a turns count anomaly can be flagged on a strip-chart recorder or if a series of fiber turns peel from a fiber optic cable dispenser of bobbin at an irregular rate, the evidence of the irregular rate as stored in the turns count data for later read out.

Any irregular performance of payout which takes place at a rate of 450 Hertz or 450 cycles per second is impossible for the human eye to detect such an occurrence in real-time mode. In operation the turns count anomaly detector system receives an output from a detector circuit, which is receiving pulses from a photodetector, inverts the signal, and a TTL logic flip-flop converts the signal to a digital format. The digital signal is then input in a TTL one-shot configured as a negative recovery monostable multivibrator. The one-shot outputs a logic low if its circuitry is not reset within a certain time period. This time period is set by the calibration of an external timing capacitor and resistor. At all times when the fiber optic cable passes between the infrared source and receiver, a logic "high" signal is output by the detector circuit. This output as constantly monitored by a turns counter pulse shaper. However, should more than one fiber turn peel from a dispenser pack at any one time the reset timing period is exceeded causing the turns count anomaly detector to output a logic "low" to a strip-chart recorder where anomaly is recorded. Additionally, if a series of fiber optic cable turns peel from the bobbin or mandrel at an irregular rate the evidence of this will be stored in the turns count data for replaying and evaluating.

DESCRIPTION OF THE PREFERRED EMBODIMENT

Figure 1:
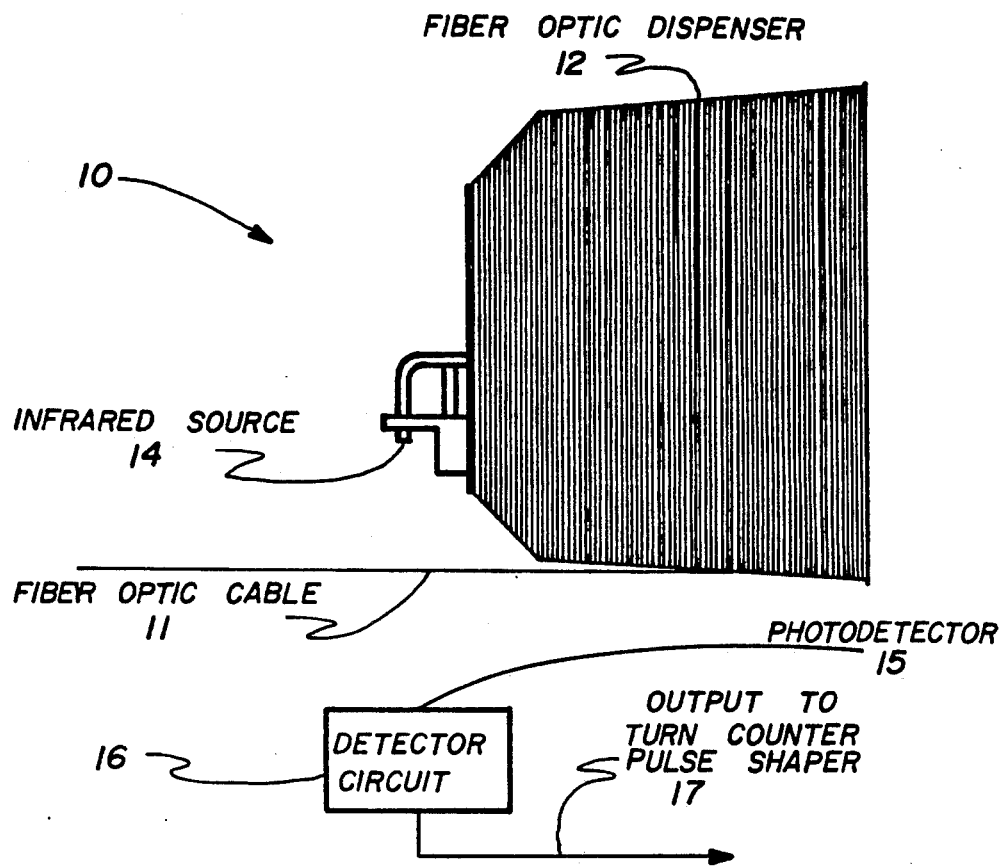
FIG. 1 depicts an infrared source and photodetector with a detector circuit electrically connected to the photodetector on opposite sides of a fiber optic cable which is being peeled off from a fiber optic cable dispenser.

A turns count anomaly is considered to be an interruption in a regular series of signals produced by a fiber optic cable breaking a beam of infrared light shining on an infrared phototransistor. The turns count anomaly detector (TCAD), shown in schematic sketch in FIG. 2, is an innovation to detect fluctuations in turns counter rate during the payout of a fiber optic cable dispenser.

During an actual flight of a fiber optic guided missile, a thin strand of fiber optic cable is spooled out from the pack of the missile. One end of the fiber is attached to the airborne electronics as in the missile and the other end is attached to the grounds electronics unit. The fiber optic cable provides uplink commands to the missile and real-time video in the ground electronic unit. The fiber optic cable provides uplink commands to the missile and real-time video in the ground electronic unit. The TCAD provides a means to ensure a successful flight without utilizing actual flight hardware. Thus, fiber optic payout testing is readily performed in the laboratory with the TCAD device to determine a successful test, i.e., one in which the fiber does not fail and no turns count anomalies are seen in the played back data. In laboratory testing or in actual flight fiber optic cable is first wound onto a conical mandrel in a very precise manner by a process known as precision winding. The fiber cable is held onto the mandrel with adhesive which provides the fiber optic cable the properties of a tacky outer surface. This type of adhesive and method of applying are disclosed in commonly assigned patent applications, Ser. No. 07/584,664, filed Sep. 14, 1990, and a divisional application thereof, Ser. No. 07/915,566, filed Jul. 20, 1992. If the adhesive is performing in accordance with the requirements, the fiber optic cable will payout from the mandrel in the same precise manner. To monitor how effectively the fiber optic cable adhesive performs its function, an infrared source 14 is mounted inside the fiber optic dispenser 12 and radiates infrared light to a photodetector 15, as shown by fiber optic dispenser, infrared source, photodetector, and detector circuit system 10 of FIG. 1, wherein the infrared source 14, photodetector 15, and detector circuit 16 constantly monitors a fiber optic cable 11 during payout to send an output 17 which as the input for turns counter pulse shaper shown in FIG. 2. The detector circuit which performs the described output from photodetector and generates an output 17 to a turn counter pulse shaper 25 described below, is available as payout trigger/detector circuit, model number 10049, from Optelecom of Gaitherburg, Md.

Figure 2:
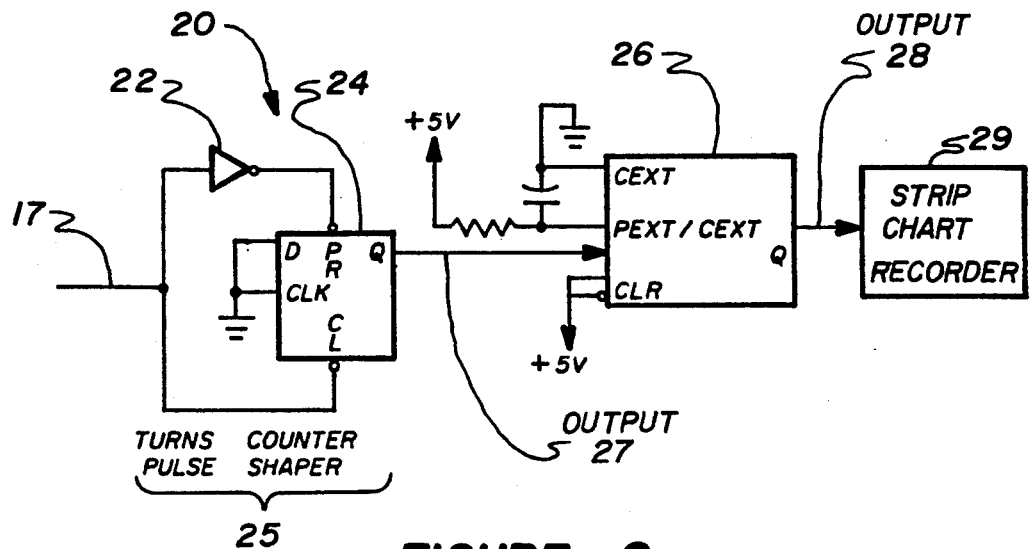
FIG. 2 depicts the turns count anomaly detector circuitry of the invention.

In further reference to FIG. 2 of the drawing which is a schematic sketch of the turns count anomaly detector 20, the detector circuit output from system 10 of FIG. 1 as electronically processed by the turns counter pulse shaper which is now described.

Figure 3:
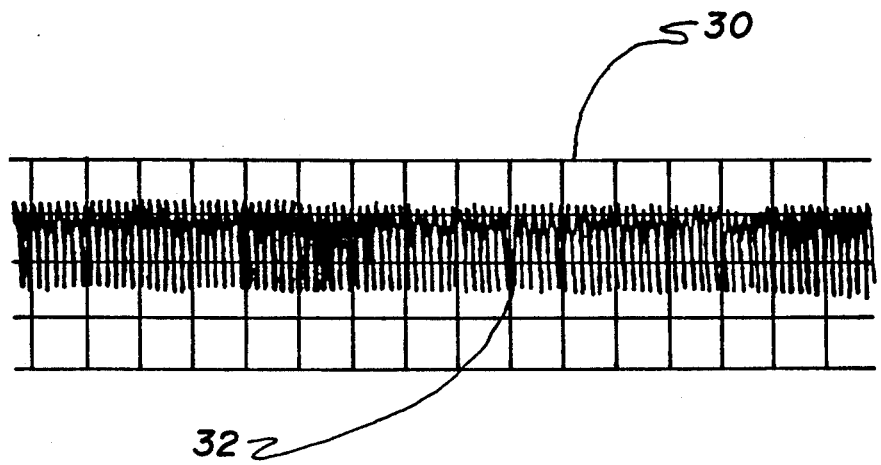
FIG. 3 depicts a typical anomaly flagged by the turns count anomaly detector by manual means on a strip-chart.
Figure 4:
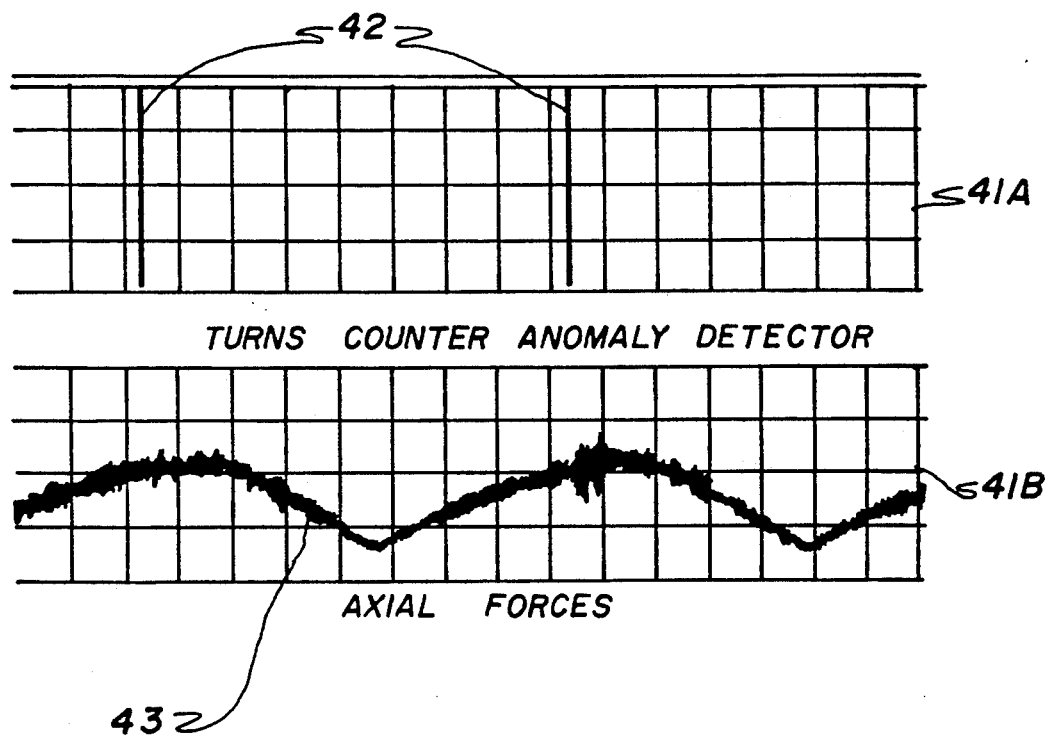
FIG. 4 depicts the same anomaly flagged in FIG. 3 which is marked on a strip-chart by the turns count anomaly detector with a second chart depicting axial forces on fiber resulting from anomaly.

The turns count anomaly detector 20 shown by FIG. 2 receives detector circuit output 17 whereby the output is inverted by element 22 and subsequently converted to a digital format signal 27 by a transistor transistor logic (TTL) flip-flop element 24. The digital signal 27 is then input in a TTL one-shot configured as a negative recovery monostable multivibrator 26. The one-shot outputs a logic low 28 if its circuitry is not reset within a predetermined time period. The predetermined time period is set by the calibration of an external timing capacitor and resistor. Every time more than one fiber turn peels from the dispenser pack at one time this reset timing period is exceeded causing the turns count anomaly detector to output a logic "low" 28 to strip-chart recorder 29. A typical anomaly found by manual means is shown in FIG. 3 as mark 32 on strip-chart 30. The turns count anomaly detector was tested at a payout speed of 700 feet per second and performed well. To check the system performance a series of calculations were performed to determine the expected rate of payout turns. The timing period for each rate was determined and the proper selection of external components was achieved. An entire payout test was replayed and stripped out at 1/400 of real-time speed which required a large quantity of strip-chart recorder paper due to speed up of chart paper. FIG. 4 depicts the same anomaly of FIG. 3 as marked by the turns count anomaly detect. The top part of strip-chart 41A depicts vertical lines 42 which represent anomaly markings and lower part of strip-chart 41B shown in real-time depicts axial forces 43 which are recorded following anomaly marking from turns counter anomaly detector. The stored data was subsequently played back through the turns count anomaly detector electronics and some component "tweeking" was performed until the desired output was reached. The system was calibrated for 700 feet per second payout speed and the described replaying of data and stripping out at 1/400 of mealtime speed verifies that the turns count anomaly detector can be used in the real-time mode.

The TTL logic flip-flop chip element 24 of FIG. 2 is commercially available from Texas Instrument Company as part number 74LS74 and which functions in flip-flop operations. This chip has designated abbreviations for specific description of internal working parts as follows: wherein CL is clear; CLK is clock; D is data; PR is preset; and Q is output. In operation, the output from chip 24 after receiving an output 17 form the turns count pulse electronics 16 of FIG. 1 outputs a Q output 27 to a TTL one-shot configured as a negative recovery monostable multivibrator 26. Subsequently, the one-shot element 26 outputs a logic low 28 if its circuitry is not reset within a predetermined time period. The logic low can be marked on a strip-chart recorder paper as exemplified by FIG. 3 for manual detection of anomaly noted by mark 32 on strip-chart 30 or as marked on strip-chart 41A as mark 42 and as recorded on strip-chart 41B as axial forces 43 recorded following anomaly markings.

The negative recovery monostable multivibrator 26 is commercially available as part no. 74LS123 from several suppliers, including Texas Instrument Company. The abbreviations shown in part 26 are as follows: CEXT is capacitor external; REXT is resistance external; and CLR is clear.

The turns count anomaly detector (TCAD) will be a major tool in determining the payout performance of candidate fiber optic cable dispenser adhesive. The TCAD is unique in that it detects and provides a visual indication of any anomalies in the real-time mode. The TCAD is a self-supporting system that can operate at any frequency and can be totally independent of manual operation. Tests to calibrate the system at payout speed of 550 feet per second or payout speeds required for the system whether it be from aircraft launched missiles or from any other launched missiles where non-line of sight (NLOS) weapon techniques are required.

Based on testing performed for the TCAD system, the benefits derived are:
1. Real-time detection of turns count anomalies.
2. Provides a marker at the area of incidence.
3. Allows correlation of payout failure with presence of turns count anomalies.
4. Automatic detection of anomalies by TCAD electronics.

I claim:
1. A turns count anomaly detector for detecting of any anomalies in the turns count payout data for a fiber optic cable being peeled off from a fiber optic cable dispenser comprising:
   (i) an infrared source for radiating light on a fiber optic cable and a photodetector, said infrared source mounted for constantly radiating said fiber optic cable and said photodetector as said fiber optic cable as peeled off from a bobbin of a fiber optic cable dispenser;
   (ii) a photodetector for receiving infrared light radiating from said infrared source;
   (iii) a detector circuit connected to said photodetector for receiving, storing data, and outputing signal relative to turns counts pulses resulting from any anomaly of said fiber optic cable being peeled off from said bobbin of a fiber optic dispenser;

(iv) a turns counter pulse shaper comprising means for inverting said signal from said detector circuit and means for receiving, converting said signal to a digital format, and transmitting said digital signal to a transistor transistor logic one-shot circuitry; and (v) a transistor transistor logic one-shot circuitry for receiving said digital signal and outputing a logic low if said one-shot circuitry as not reset within a certain time period, said time period is a time set by the calibration of an external timing capacitor and resistor of said transistor transistor logic one-shot circuitry.

2. A turns count anomaly detector for detection of any anomalies in the turns count payout data for a fiber optic cable being peeled off from a fiber optic cable dispenser as disclosed in claim 1 wherein said transistor transistor one-shot circuitry is configured as a negative recovery monostable multivibrator.

3. A turns count anomaly detector for detection of any anomalies in the turns count payout data for a fiber optic cable being peeled off from a fiber optic cable dispenser as disclosed in claim 2 wherein said logic low for all occurrences of turns count anomalies are marked on a strip-chart recorder for manual verification and location.

4. A turns count anomaly detector for detection of any anomalies in the turns count payout data for a fiber optic cable being peeled off from a fiber optic cable dispenser or disclosed in claim 3 wherein said logic low for all occurrences of turns count anomalies are recorded for replaying and stripping at 1/400 of real-time speed for calibrated peel off speeds up to about 700 feet per second for use of said turns count anomaly detector in a real-time mode.

* * * * *